(12) United States Patent
Li et al.

(10) Patent No.: US 12,357,961 B2
(45) Date of Patent: Jul. 15, 2025

(54) COATING FORMULATION, AN ARTICLE AND METHODS TO PREPARE THE SAME

(71) Applicant: AGENCY FOR SCIENCE, TECHNOLOGY AND RESEARCH, Singapore (SG)

(72) Inventors: Xu Li, Singapore (SG); Chin Chong Yap, Singapore (SG); Jiating He, Singapore (SG); Siew Yee Wong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 1018 days.

(21) Appl. No.: 17/267,681

(22) PCT Filed: Aug. 8, 2019

(86) PCT No.: PCT/SG2019/050395
§ 371 (c)(1),
(2) Date: Feb. 10, 2021

(87) PCT Pub. No.: WO2020/032874
PCT Pub. Date: Feb. 13, 2020

(65) Prior Publication Data
US 2021/0316271 A1    Oct. 14, 2021

(30) Foreign Application Priority Data

Aug. 10, 2018 (SG) .......................... 10201806816W (51) Int. Cl.
| | | |
|---|---|---|
| *B01J 20/02* | (2006.01) |
| *A23B 2/717* | (2025.01) |
| *B01J 20/12* | (2006.01) |
| *B01J 20/20* | (2006.01) |
| *B01J 20/26* | (2006.01) |
| *B01J 20/28* | (2006.01) |
| *B01J 20/30* | (2006.01) |
| *B65D 65/42* | (2006.01) |
| *B65D 81/26* | (2006.01) |

(52) U.S. Cl.
CPC .......... *B01J 20/0229* (2013.01); *A23B 2/717* (2025.01); *B01J 20/12* (2013.01); *B01J 20/20* (2013.01); *B01J 20/261* (2013.01); *B01J 20/262* (2013.01); *B01J 20/28026* (2013.01); *B01J 20/28033* (2013.01); *B01J 20/3042* (2013.01); *B01J 20/3085* (2013.01); *B65D 65/42* (2013.01); *B65D 81/266* (2013.01); *A23V 2002/00* (2013.01)

(58) Field of Classification Search
CPC .................................................. B01J 20/0229
See application file for complete search history.

(56) References Cited

U.S. PATENT DOCUMENTS

| | | |
|---|---|---|
| 4,970,189 A | 11/1990 | Tachibana |
| 2002/0086929 A1 | 7/2002 | Chiang et al. |
| 2006/0069197 A1 | 3/2006 | Tammaji et al. |
| 2010/0282633 A1 | 11/2010 | Chau et al. |
| 2012/0187345 A1 | 7/2012 | Menozzi et al. |

FOREIGN PATENT DOCUMENTS

| | | |
|---|---|---|
| JP | 59-146578 | 8/1984 |
| JP | S63281964 A | 11/1988 |
| JP | 2013-502473 A | 1/2013 |
| WO | WO-99/27010 A1 | 6/1999 |
| WO | WO-2016/190815 A1 | 12/2016 |

OTHER PUBLICATIONS

Yeh et al. ("Investigation of the Oxygen Depletion Properties of Novel Oxygen-Scavenging Plastics" Journal of Applied Polymer Science, 2008, 110, 1420-1434). (Year: 2008).*
Notice of Reasons for Rejection in JP Application No. 2021-506932 dated Oct. 10, 2023, 4 pages.
Search Report and Written Opinion in International Application No. PCT/SG2019/050395 dated Oct. 7, 2019, 11 pages.
Search Report and Written Opinion in Singapore Application No. 11202101279Y dated Sep. 23, 2021, 11 pages.
Extended European Search Report in EP Application No. 19846631.0 dated Mar. 29, 2022, 9 pages.
Notice of Reasons for Rejection in JP Application No. 2021-506932 dated Jun. 27, 2023, 7 pages.

* cited by examiner

*Primary Examiner* — Peter F Godenschwager
(74) *Attorney, Agent, or Firm* — MARSHALL, GERSTEIN & BORUN LLP

(57) ABSTRACT

There is provided a coating formulation comprising an inorganic oxygen scavenger, a surfactant, an activator, a hydrophilic agent, optionally an additive and a plurality of monomers capable of forming a polymeric matrix, and a method to prepare the same. There is also provided an article comprising an inorganic scavenger, a surfactant, an activator, a hydrophilic agent and optionally an additive dispersed within a polymeric matrix, and a method to prepare the same.

11 Claims, 5 Drawing Sheets

COATING FORMULATION, AN ARTICLE AND METHODS TO PREPARE THE SAME

REFERENCES TO RELATED APPLICATIONS

This application claims priority to Singapore application number 10201806816W filed on 10 Aug. 2018, the disclosure of which is hereby incorporated by reference.

TECHNICAL FIELD

The present invention relates to a coating formulation, an article and methods to prepare the same for oxygen scavenging packaging.

BACKGROUND ART

Oxygen ($O_2$) is one of the main factors resulting in the spoilage of food. The presence of $O_2$ results in the deterioration of quality, change in color, loss of nutrient, and growth of microorganism. As such, different technologies such as vacuum packaging and modified atmospheres packaging (MAP) to limit the $O_2$ concentration in the packaging are commonly use. However, these technologies require costly investment and are unable to remove the $O_2$ in the packed food completely, leaving a residual concentration around 0.5 to 2%. Furthermore, the level of oxygen in the plastic packaging will increase over the period due to $O_2$ from external environment penetrating into the package.

A majority of existing oxygen scavengers are based on iron powder, ascorbic acid, and unsaturated hydrocarbon scavengers. Organic and unsaturated hydrocarbon scavengers are relatively unstable and may give out odor as a byproduct after the oxidation process.

A known method for preparing a sheet-like oxygen scavenger which is fixed to the inner wall of a packaging involved filtration. The oxygen scavenger film prepared by filtration was laminated between films which have oxygen permeability greater than 1000 cc/m²·day. The oxygen scavenger was based on iron powder with sizes greater than 50 microns. Another multilayer film was prepared by adding microsized iron particles, sodium chloride and acidifying components such as aluminum chloride into a mechanical mixing machine to achieve uniformly mixing of components. However, in view of the micron-sized iron powder used, the iron powder was prone to migration which can affect the oxygen scavenging ability of the film.

Another known method was used to provide biodegradable oxygen absorbing plastic comprising a biodegradable substrate and a sufficient concentration of reduced iron particles. The oxygen scavenger was surrounded with biodegradable substrate (PLA) which had higher gas permeation as compared to common polyolefin. A layer of aluminum foil was then laminated onto the film. However, this resulted in a non-transparent film, which is not desirable.

Still another known method of producing a finely dispersed iron/salt particle in a polymer matrix comprised pre-coating 1 to 25 micron mean particle size iron using melt extrusion method. The surfactants used for treating the resin pellets or coated iron powders in order to maximize dispersion included lubricants such as mineral oil, fatty acids such as stearic acid, and low molecular weight compounds such as waxes. Some of these surfactants may be organic or may interact with food aroma causing a change in the taste or aroma of the food. Therefore, such oxygen scavengers cannot be used in food packaging as this will affect the food experience of the consumer.

Therefore, there is a need to provide a coating formulation, an article and methods to prepare the same that overcome or ameliorate one or more of the disadvantages mentioned above.

SUMMARY

In one aspect, the present disclosure relates to a coating formulation comprising:
a) an inorganic oxygen scavenger;
b) a surfactant;
c) an activator;
d) a hydrophilic agent;
e) optionally an additive; and
f) a polymeric matrix.

Advantageously, the inorganic oxygen scavenger such as iron based oxygen scavenger is widely available and with high scavenging efficiency. The surfactant may aid in enhancing the dispersion of the inorganic oxygen scavenger and the activator into the polymer matrix. The introduction of the hydrophilic agent can improve the moisture permeability of the polymer matrix and further improve the oxygen scavenging performance. Finally, the addition of additive may aid in enhancing the scavenging performance of the inorganic oxygen scavenger by regenerating the inorganic oxygen scavenger after oxidation.

Further advantageously, the coating formulation can be applied as part of plastic packaging (which are typically used to package food or beverages), with high transparency and without odor after oxygen scavenging. The prepared coating formulation can be applied using industrial coating process during the plastic film production.

In another aspect, the present disclosure relates to a method to prepare the coating formulation as defined herein, comprising the steps of a) mixing an inorganic oxygen scavenger, a surfactant, an activator, a hydrophilic agent, optionally an additive, and b) mixing the mixture from step a) with a polymeric matrix or monomers of said polymeric matrix.

In another aspect, the present disclosure relates to an article comprising an inorganic oxygen scavenger, a surfactant, an activator, a hydrophilic agent, and optionally an additive dispersed within a polymeric matrix Advantageously, a good dispersion (homogeneity) of the inorganic oxygen scavenger can be achieved without agglomeration and result in a transparent article. The article may be a film or a coating.

In another aspect, the present disclosure relates to a method of forming an article, comprising the step of curing a coating formulation comprising an inorganic oxygen scavenger, a surfactant, an activator, a hydrophilic agent, optionally an additive, and a polymeric matrix or monomers of said polymeric matrix.

Definitions

The following words and terms used herein shall have the meaning indicated:

The term 'biomass material' is to be interpreted broadly to include biological material derived from living, or living organisms. This is often used to mean plant based material but can equally apply to both animal and vegetable derived material when biomass is used for energy. Herein, biomass is carbon based and is composed of a mixture of organic molecules containing hydrogen, usually including atoms of oxygen, often nitrogen, and also small quantities of other atoms, including alkali, alkaline earth and heavy metals.

The term "composite" as used herein represents material made from two or more constituent materials with significantly different physical or chemical properties that, when combined, produce the material. The individual components remain separate and distinct within the finished material.

The term "oxygen scavenging" as used herein refers to an act of gathering or removing oxygen from an enclosed area or mixture.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a coating formulation will now be disclosed.

The present disclosure relates to a coating formulation that comprises:
a) an inorganic oxygen scavenger;
b) a surfactant;
c) an activator;
d) a hydrophilic agent;
e) optionally an additive; and
f) a polymeric matrix.

The inorganic oxygen scavenger may be a composite of an inorganic metal material and a carbon material. The carbon material may be a carbon particle that was derived from biomass materials. The biomass material may be selected from the group consisting of a lignin, a saccharide, a fatty acid, a protein, and combinations thereof. It is to be noted that the type of biomass material is not particularly limited as long as it can undergo a carbothermal reaction to form carbon particles. As mentioned above, due to the use of biomass as a source for the carbon material, the resultant carbon material would have a layer of saccharide (such as monosaccharide, disaccharide, polysaccharide or oligosaccharide) that is able to absorb the inorganic metal material.

The carbon material may have a porous structure. The pore size of the porous carbon material may be in the range of about 10 nm to about 700 nm, about 10 nm to about 100 nm, about 10 nm to about 200 nm, about 10 nm to about 300 nm, about 10 nm to about 400 nm, about 10 nm to about 500 nm, about 10 nm to about 600 nm, about 100 nm to about 700 nm, about 200 nm to about 700 nm, about 300 nm to about 700 nm, about 400 nm to about 700 nm, about 500 nm to about 700 nm, or about 600 nm to about 700 nm. The carbon material may be carbon having a spherical or a substantially spherical shape or morphology.

The carbon material may have a diameter in the range of about 100 nm to about 1 μm, about 100 nm to about 200 nm, about 100 nm to about 300 nm, about 100 nm to about 400 nm, about 100 nm to about 500 nm, about 100 nm to about 600 nm, about 100 nm to about 700 nm, about 100 nm to about 800 nm, about 100 nm to about 900 nm, about 200 nm to about 1 μm, about 300 nm to about 1 μm, about 400 nm to about 1 μm, about 500 nm to about 1 μm, about 600 nm to about 1 μm, about 700 nm to about 1 μm, about 800 nm to about 1 μm, or about 900 nm to about 1 μm.

The inorganic metal/carbon composite may comprise a plurality of the inorganic metal material in particulate form disposed within or thereon the carbon material. The inorganic metal particle(s) may be uniformly or randomly distributed on the carbon material, whether on the surfaces of the carbon material or within the pores of the carbon material. The inorganic metal particle may have a particle size of less than about 500 nm, less than about 200 nm, less than about 100 nm, less than about 50 nm or about 1 nm to about 50 nm. The nano-size inorganic metal particles embedded within or on the carbon material may limit the risk of migration of the inorganic metal from the polymer system.

The inorganic metal material may be iron. The iron may be a zero-valent iron particle when deposited on the carbon material.

The inorganic metal/carbon composite may be a plurality of iron particles embedded within or on carbon sphere(s). The inorganic metal/carbon composite may be a nanoparticle.

The amount of inorganic oxygen scavenger in the coating formulation may be in the range of about 1 wt % to about 20 wt %, about 1 wt % to about 18 wt %, about 1 wt % to about 16 wt %, about 1 wt % to about 14 wt %, about 1 wt % to about 12 wt %, about 1 wt % to about 10 wt %, about 1 wt % to about 8 wt %, about 1 wt % to about 6 wt %, about 1 wt % to about 4 wt %, about 1 wt % to about 2 wt %, about 2 wt % to about 20 wt %, about 4 wt % to about 20 wt %, about 6 wt % to about 20 wt %, about 8 wt % to about 20 wt %, about 10 wt % to about 20 wt %, about 12 wt % to about 20 wt %, about 14 wt % to about 20 wt %, about 16 wt % to about 20 wt %, or about 18 wt % to about 20 wt %.

The surfactant may be natural clay, synthetic clay or silane(s) modified clay. The surfactant may be clay. The surfactant may be selected from the group consisting of montmorillonite (MMT), bentonite, laponite, kaolinite, saponite, vermiculite, layered double hydroxides (LDH) and mixtures thereof. The solid surfactant may be added in a small amount to the inorganic metal/carbon composite. The amount of surfactant in the coating formulation may be in the range of about 0.5 wt % to about 10 wt %, about 1 wt % to about 10 wt %, about 2 wt % to about 10 wt %, about 3 wt % to about 10 wt %, about 5 wt % to about 10 wt %, about 7 wt % to about 10 wt %, about 9 wt % to about 10 wt %, about 0.5 wt % to about 9 wt %, about 0.5 wt % to about 7 wt %, about 0.5 wt % to about 5 wt %, about 0.5 wt % to about 3 wt %, about 0.5 wt % to about 2 wt % or about 0.5 wt % to about 1 wt %. The surfactant may be a solid surfactant.

The activator may be a halide salt or an acidifying agent. The cation of the halide salt may be a metal selected from Group 1, Group 2 or Group 13 of the Periodic Table of Elements. The anion of the halide salt may be a chloride. The activator may be sodium chloride (NaCl), calcium chloride ($CaCl_2$)), aluminium chloride ($AlCl_3$), sodium fluoride (NaF), calcium fluoride ($CaF_2$), aluminium fluoride ($AlF_3$), sodium bromide (NaBr), calcium bromide ($CaBr_2$), aluminium bromide ($AlBr_3$), sodium iodide (NaI), calcium iodide ($CaI_2$), or aluminium iodide ($AlI_3$). Where the activator is an acidifying agent, the acidifying agent may be polyethylacrylic acid, polymaleic acid or citric acid. The amount of the activator in the coating formulation may be in the range of about 1 to about 20 wt %, about 2 to about 20 wt %, about 5 to about 20 wt %, about 10 to about 20 wt %, about 15 to about 20 wt %, about 1 to about 15 wt %, about 1 to about 10 wt %, about 1 to about 8 wt %, about 1 to about 6 wt %, about 1 to about 5 wt %, about 1 to about 3 wt %, or about 5 to 10 wt %.

The hydrophilic agent may be a polymer comprising monomers selected from an alkylene oxide, a carboxylic acid and combinations thereof. The alkylene oxide monomer may be an ethylene oxide, propylene oxide, butylene oxide, pentylene oxide, hexylene oxide, heptylene oxide, octylene oxide, nonylene oxide or decylene oxide. The carboxylic acid monomer may be acrylic acid or maleic acid. The polymer may be a homopolymer or a copolymer. The polymer may have a molecular weight in the range of about 100,000 to about 5,000,000. The hydrophilic agent may be selected from the group consisting of short chain polymers, such as poly (ethylene oxide) (PEO) or polyacrylic acid. The amount of the hydrophilic agent in the coating formulation may be in the range of about 0.5 to about 10 wt %, about 0.6 to about 10 wt %, about 0.8 to about 10 wt %, about 1 to about 10 wt %, around 0.5 to about 5 wt %, or about 0.5 to about 2 wt %.

The additive may be a reducing agent. The additive may be a reducing organic acid. The additive may be ascorbic acid. The additive may have a pH value in the range of 1.0 to 2.5.

The amount of the additive in the coating formulation may be in the range of about 0 to about 2.5 wt %, about 0.1 to about 2.5 wt %, about 0.2 to about 2.5 wt %, about 0.3 to about 2.5 wt %, about 0.4 to about 2.5 wt %, about 0.5 to about 2.5 wt %, about 0.7 to about 2.5 wt %, about 0.9 to about 2.5 wt %, about 1 to about 2.5 wt %, about 1.2 to about 2.5 wt %, about 1.5 to about 2.5 wt %, about 1.7 to about 2.5 wt %, about 2 to about 2.5 wt %, about 0.1 to about 2.3 wt %, about 0.1 to about 2 wt %, about 0.1 to about 1.5 wt %, about 0.1 to about 1.2 wt %, about 0.1 to about 1 wt %, about 0.2 to about 1 wt %, about 0.3 to about 1 wt %, about 0.5 to about 1 wt %, about 0.6 to about 1 wt %, or about 0.7 to about 1 wt %.

The polymer matrix may be selected from a polyurethane (PU), a polyacrylate, a poly(meth)acrylate, a polyepoxide (or epoxy) or an ethylene vinyl alcohol copolymer (EVOH). The molecular weight of the polymer formed may be in the range of about 10,000 to about 500,000, about 20,000 to about 500,000, about 50,000 to about 500,000, about 100,000 to about 500,000, about 200,000 to about 500,000, about 300,000 to about 500,000, about 10,000 to about 300,000, about 10,000 to about 100,000, about 20,000 to about 200,000, about 50,000 to about 200,000, about 100,000 to about 200,000, about 120,000 to about 200,000, about 150,000 to about 200,000.

The coating formulation described herein may comprise:
a) an inorganic Fe/C composite;
b) clay as the surfactant;
c) sodium chloride (NaCl) as the activator;
d) polyethylene oxide (PEO) or polyacrylic acid as the hydrophilic agent;
e) ascorbic acid as the additive; and
f) a polymeric matrix such as polyurethane, polyacrylate and/or epoxy.

Exemplary, non-limiting embodiments of a method to prepare the coating formulation as described herein will now be disclosed.

The method to prepare the coating formulation described herein, comprises the steps of a) mixing an inorganic oxygen scavenger, a surfactant, an activator, a hydrophilic agent, optionally an additive, and b) mixing the mixture from step a) with a polymeric matrix or monomers of said polymeric matrix.

The mixing process of the coating formulation can be by Thinky mixer, vortex, homogenizer, high speed stirring.

The method to prepare the coating formulation may further comprise a degassing step. Various methods of degassing the coating formulation may be done using a sonicator (degassing), Thinky mixer (degas mode), or bubbling of nitrogen or helium gas. The degassing is needed to remove the bubbles, especially after mixing using homogenization.

The method to prepare the coating formulation may further comprise a crosslinking step wherein the polymeric matrix is formed by a plurality of monomers capable of forming the polymeric matrix with the addition of a polymerization crosslinker. The plurality of monomers that are capable of forming a polymeric matrix may be selected from the group consisting of carbamate, (meth)acrylate, epoxide, alkylene, alkenol and combinations thereof. The polymeric matric may comprise a polymer such as a homopolymer or a copolymer. The resultant mixture comprising the polymerization crosslinker may be mixed for 2, 3, 4 or 5 minutes. Following which, the mixture may be deaerated for 2, 3, 4 or 5 minutes.

The method to prepare the coating composition described herein may comprise the steps of:
a) mixing inorganic Fe/C material and clay surfactant with an activator solution;
b) optionally mixing the at least one additive with the mixture obtained in step a);
c) mixing the hydrophilic agent with the mixture obtained in step a) or b), when the additive is present; and
d) mixing the mixture obtained in step c) with a polyurethane monomer; and
e) mixing a crosslinker with the mixture obtained in step d) to form the coating formulation described herein.

Exemplary, non-limiting embodiments of an article will now be disclosed.

The coating formulation may be used to form an article. Advantageously, the clay may be used to enhance the dispersion of inorganic oxygen scavenger in the article. Further advantageously, the surfactant may also enhance the dispersion of the activator and incorporate it into the article.

The article may comprise an inorganic scavenger, a surfactant, an activator, a hydrophilic agent, and optionally an additive dispersed within a polymeric matrix.

The article may be a film or a coating. The article may be a transparent film or coating. The transparent film or coating may have a thickness in the range of about 5 μm to about 50 μm, about 5 μm to about 40 μm, about 5 μm to about 30 μm, about 5 μm to about 20 μm, about 5 μm to about 10 μm, about 10 μm to about 50 μm, about 20 μm to about 50 μm, about 30 μm to about 50 μm, about 40 μm to about 50 μm, about 10 μm to about 40 μm, about 20 μm to about 40 μm or about 30 μm to about 40 μm.

The transmittance of the article may be more than about 70%, more than about 75%, more than about 80%, more than about 85%, more than about 90%, or more than about 95%. In order to achieve this transmittance level, the amount of the inorganic oxygen scavenger in the article may depend on the type of polymeric matrix formed (which is in turn dependent on the type of monomers used to form the polymeric matrix). Where the polymeric matrix is polyurethane, the amount of the inorganic oxygen scavenger in the polymeric matrix may be less than 5 wt % in order to achieve a transmittance of more than about 70%. Where the polymeric matrix is ethylene vinyl alcohol copolymer, the amount of the inorganic oxygen scavenger in the polymeric matrix may be less than about 20 wt % in order to achieve a transmittance of more than about 70%.

The article for oxygen scavenging may be used in a range of working temperatures. The working temperatures may be in the range of about 0 to about 125° C., about 10 to about 125° C., about 20 to about 125° C., about 30 to about 125° C., about 50 to about 125° C., about 100 to about 125° C., about 10 to about 100° C., about 10 to about 50° C., about 10 to about 30° C., about 20 to about 30° C. The working condition may be at room temperature for storage. The working condition may also be high temperatures for food sterilization (e.g. retort packaging at about 120° C.).

The article without the additive may have a maximum oxygen scavenging performance in the range of about 7 to about 9 cc/100 cm², about 7.5 to about 9 cc/100 cm², about 8 to about 9 cc/100 cm², about 8.5 to about 9 cc/100 cm², about 7 to about 7.5 cc/100 cm², about 7 to about 8.0 cc/100 cm², or about 7 to about 8.5 cc/100 cm², based on 1.41 wt % inorganic oxygen scavenger at 60° C. It will take a longer time to reach the same oxygen scavenging performance at lower temperature.

The article with the additive may have a maximum oxygen scavenging performance in the range of about 12 to about 14 cc/100 cm², about 12.5 to about 14 cc/100 cm², about 13 to about 14 cc/100 cm², about 13.5 to about 14 cc/100 cm², about 12.0 to about 12.5 cc/100 cm², about 12.0 to about 13 cc/100 cm², or about 12.0 to about 13.5 cc/100 cm², based on 1.41 wt % inorganic oxygen scavenger at 60° C. It will take a longer time to reach the same oxygen scavenging performance at lower temperature.

The addition of the additive to the coating formulation may have a synergistic effect in enhancing the oxygen scavenging performance of the inorganic oxygen scavenger. The oxygen scavenging performance of the inorganic oxygen scavenger may be increased in the range of about 40 to 60% due to the regenerative effect of the additive to reduce the inorganic metal material from a higher oxidation state to a lower oxidation state, the lower oxidation state of the inorganic metal being able to scavenge (or react) with oxygen again to form an oxide. Where the inorganic metal particle is iron, the additive reduces $Fe(III)$ to $Fe(II)$ and thereby regenerates the $Fe(II)$ to scavenge oxygen present to form iron oxide. The additive being ascorbic acid can relieve the accumulation of $Fe(III)$ by enabling the $Fe(III)/Fe(II)$ cycles through the oxidation of ascorbic acid. The regenerated $Fe(II)$ can be further used to scavenge oxygen to form $Fe(III)$, hence increasing the oxygen scavenging performance. The ascorbic acid can also lower the redox potential of $Fe(III)/Fe(II)$ through chelating effect, for which the ascorbic acid could enhance reactive oxygen species generation via oxygen activation by ferrous irons.

The present disclosure also relates to a method of forming an article, comprising the step of curing a coating formulation comprising an inorganic oxygen scavenger, a surfactant, an activator, a hydrophilic agent, optionally an additive, and a polymeric matrix or monomers of said polymeric matrix. The polymeric matrix may be formed by a plurality of monomers capable of forming the polymeric matrix with the addition of a polymerization crosslinker.

The method may further comprise the step of coating the article on a polymeric substrate to form a film or a coating thereon the polymeric substrate.

The polymer of the polymeric substrate may be selected from the group consisting of polyethylene terephthalate (PET), polypropylene (PP) and polyethylene (PE). The thickness of the article on the polymeric substrate may be in the range of about 20 to about 40 μm. Where necessary, the article on the polymeric substrate may be dried.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

EXAMPLES

Non-limiting examples of the invention and a comparative example will be further described in greater detail by reference to specific Examples, which should not be construed as in any way limiting the scope of the invention.

Materials and Methods

Example 1: Preparation of Coating Formulation Using Thinky Mixer 0.015 g of NaCl (99.5-100.5%, ACS Reagant Grade from VWR Chemicals) was first dissolved with 2 ml of $H_2O$. The Iron/Carbon scavenger was prepared according to the method disclosed in PCT/SG2018/050235, which is hereby incorporated by reference. Briefly, the Iron/Carbon scavenger has a carbon sphere size of about 300 nm and was synthesized using 40 wt % iron and 20 wt % glucosamine. Different amount of Iron/Carbon oxygen scavenger [as described in Table 1 and 2], were added to the solution and mixed by vortex. 1 ml of PAA (Mw 450 k from Polyscience) was added to the suspension and mixed again. 1 ml of MMT clay (Nanocor) solution (4 wt %) was added to the suspension and mixed using vortex mixer again.

The prepared suspension was now added into PU monomer (Aqueous polycarbonate based polyurethane from STAHL), sealed in a container and flushed with $N_2$, and mixed for 5 minutes using Thinky mixer. PU crosslinker (Melamine based crosslinker for aqueous coating from STAHL) was added and mixed for another 2 minutes, followed by 2 minutes deforming. The coating suspension was coated onto PET film and dried in a vacuum oven at the curing temperature (110° C.).

Figure 1:
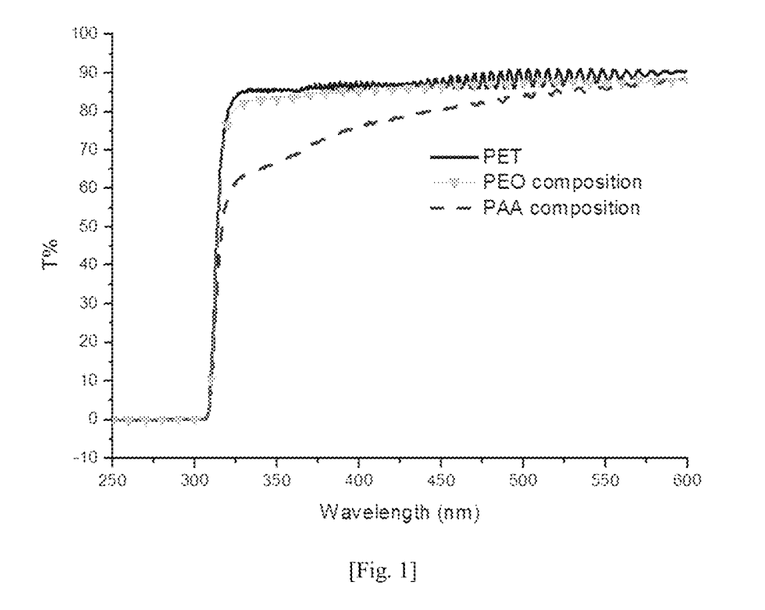
FIG. 1 shows the transmittance of the prepared films with PAA or PEO as the hydrophilic agent and PET film as a control.

The same procedure was used to prepare the film with PEO (Mw 400 k from Stigma Aldrich) by replacing the PAA in the above sequence. The transparency of the films using PEO and PAA as hydrophilic agent is shown in FIG. 1 in comparison with PET film alone. The film using PEO as hydrophilic agent showed higher transparent as compared to the film using PAA as hydrophilic agent. Both films using PAA and PEO as hydrophilic agents showed transmittance of more than 70% in the visible range.

Table 1 shows the composition of the coating formulation and the attained oxygen scavenging capacity after 1 week.

|   | PU (g) | PAA (g) | PEO (g) | Clay (g) | Iron/Carbon (g) | PU cross-linker (g) | Scavenging Capacity/ 100 cm² |
|---|---|---|---|---|---|---|---|
| PAA composition | 3.5 | 0.06 | 0 | 0.04 | 0.1 | 0.52 | 1.1 |
| PEO composition | 3.5 | 0 | 0.06 | 0.04 | 0.1 | 0.52 | 0.92 |

Figure 2:
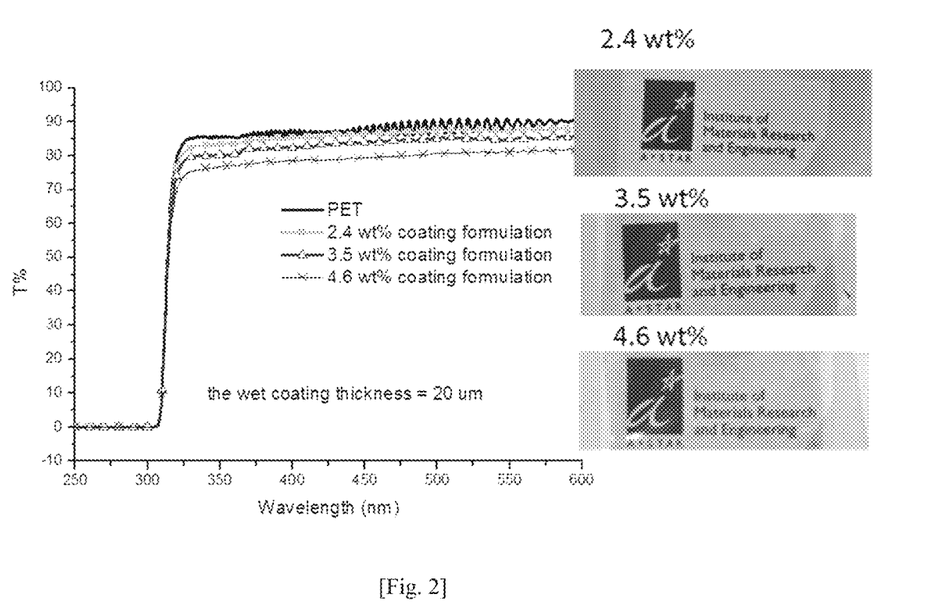
FIG. 2 shows the transmittance of the prepared films with different amount of Fe/C composite and PET film as a control.

The transparency of the films using different amount of iron/carbon oxygen scavengers is shown in FIG. 2 in comparison with PET film alone. The transmittance slight decreased with higher content of the iron/carbon oxygen scavengers. The logos under the film are clearly visible.

Table 2 shows the different amount of Iron/Carbon scavenger to prepare different wt % of coating formulation. The oxygen scavenging capacity is calculated based on 1 week at 60° C. (20 μm coating thickness).

|   | PU (g) | PEO (g) | Clay (g) | Iron/Carbon (g) | NaCl (g) | PU cross-linker (g) | Scavenging Capacity/ 100 cm² |
|---|---|---|---|---|---|---|---|
| 4.6 wt % | 3.6 | 0 | 0 | 0.2 | 0.015 | 0.52 | 0.0 |
| 2.4 wt % | 3.5 | 0.06 | 0.04 | 0.1 | 0.015 | 0.52 | 0.92 |
| 3.5 wt % | 3.5 | 0.06 | 0.04 | 0.15 | 0.015 | 0.52 | 1.42 |
| 4.6 wt % | 3.5 | 0.06 | 0.04 | 0.2 | 0.015 | 0.52 | 1.89 |

Without coating formulation (4.6 wt % Iron/Carbon in PU), no oxygen scavenging was observed for the film prepared. With proper formulation, oxygen scavenging can be achieved for the films which increased oxygen scavenging performance with the increase of Iron/Carbon weight percentage.

Example 2: Coating Formulation with NaCl for Polymer that Cannot Dissolve NaCl 0.015 g of NaCl was first dissolved with 2 ml of $H_2O$. 1 ml of MMT clay solution (4 wt %) was added to the suspension and mixed using vortex mixer again. 0.2 g of Iron/Carbon oxygen scavenger was added to the solution and mixed by vortex The prepared suspension was now added into 10 g of polyurethane (Aqueous polycarbonate based polyurethane from Mitsui Chemicals), sealed in a container and flushed with N2, and mixed for 5 min using Thinky mixer, and degassed for 5 min. The coating suspension was coated onto PET film and dried in a vacuum oven at the curing temperature.

Strips of 8 cm×12 cm of the dried film was cut and placed into a placed into a 50 ml flask and sealed with a rubber septa. The oxygen concentration is measured using a SYSTECH Headspace Gas Analyser. The results are shows below.

Table 3 shows the oxygen scavenging performance of the coating formulation with and without NaCl, and at room temperature and 60° C. (20 μm coating thickness)

|   | Oxygen Concentration in 50 ml flask (%) (At room temperature) | | | Oxygen Concentration in 50 ml flask (%) (60° C.) |
|---|---|---|---|---|
| Time (Days) | 4.6 wt % Iron/Carbon coating in polyurethane (No NaCl) | 4.6 wt % Iron/Carbon coating in polyurethane (with NaCl and clay) | Time (Days) | 4.6 wt % Iron/Carbon coating in polyurethane (with NaCl and clay) |
| 0 | 20.9% | 20.9% | 0 | 20.9% |
| 5 | 20.9% | 16.7% | 1 | 15.9% |
| 12 | 20.9% | 15.4% | 3 | 7.63% |
| 20 | 20.9% | 12.6% | 7 | 0.107% |
| Scavenging Capacity/ 100 cm² | 0 | 4.32 | Scavenging Capacity/ 100 cm² | 10.8 |

Figure 3A:
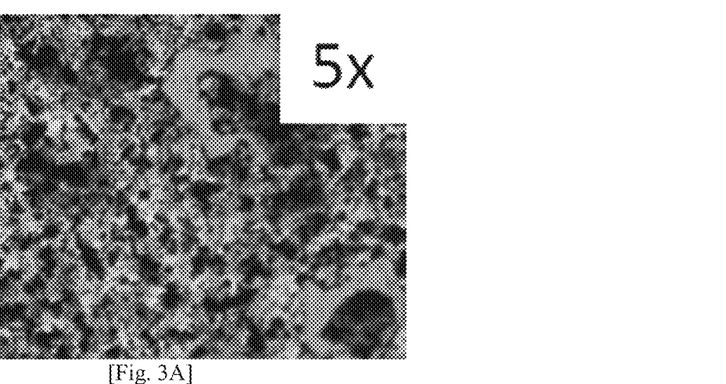
FIG. 3 shows the comparison of film formation without (A) and with (B) clay as the surfactant.
Figure 3B:
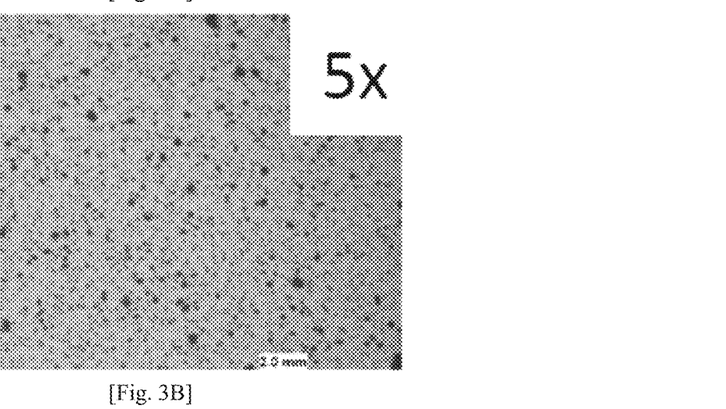

The film with clay as the surfactant showed much smoother surface as compared to the film without clay surfactant, as shown in FIG. 3. Poor dispersion was observed by dispersing 4.6 wt % Iron/Carbon in polyurethane only (FIG. 3A). With clay addition, good dispersion was achieved (FIG. 3B).

Figure 4:
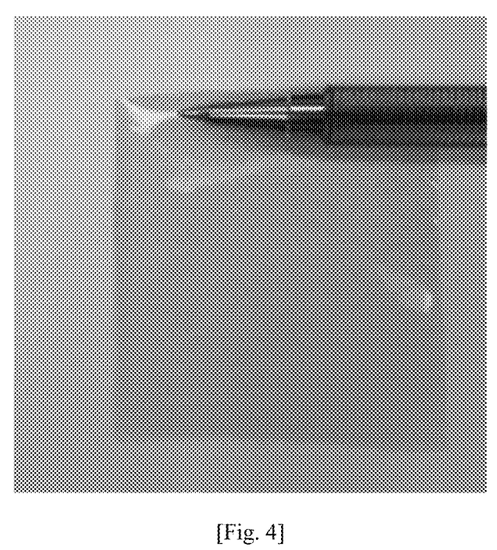
FIG. 4 shows the appearance of the film formed by Iron/Carbon oxygen scavenger in EVOH.

Example 3: Iron/Carbon Oxygen Scavenger in EVOH 10 wt % EVOH solution was prepared by dissolving EVOH pellets in n-propanol/water (65:35), and stirred at 65° C. overnight (around 18 hours). 0.2 g of Iron/Carbon oxygen scavenger was added to 10 g of 10 wt % EVOH solution to achieve 20 wt % coating (the weight of Iron/Carbon to EVOH). The appearance of the film with Iron/Carbon oxygen scavenger in EVOH is shown in FIG. 4. A good transparency was also observed similar to the film prepared in polyurethane.

Table 4 shows the oxygen scavenging capacity of the film and its appearance

| | Oxygen Scavenging (cc/(100 cm² of coated film)) 60° C. |
|---|---|
| 20 wt % of Iron/Carbon in EVOH | 1.32 |

Example 4: Iron/Carbon Oxygen Scavenger with Clay in EVOH

To prepare clay in propanol/H$_2$O, 0.2 g of MMT clay has to be dispersed into 5 ml of H$_2$O followed by adding 5 ml of propanol to obtain 2 wt % in propanol/H$_2$O. Otherwise, the MMT clay will precipitate. Iron/Carbon, clay, EVOH coating formulation can be prepared according to the above examples.

Example 5: Improvement of Scavenging Capacity of Iron/Carbon Coating with the Addition of Ascorbic Acid 0.015 g of NaCl was first dissolved with 2 ml of H$_2$O. 0.2 g of Iron/Carbon oxygen scavenger was added to the solution and mixed by vortex. 50 mg of ascorbic acid (AA) (L-(+)-Ascorbic acid, 99+% from Alfa Aesar) was added. 1 ml of PAA was added to the suspension and mixed again. 1 ml of MMT clay solution (4 wt %) was added to the suspension and mixed using vortex mixer again.

The prepared suspension was now added into PU monomer (Aqueous polycarbonate based polyurethane from STAHL), sealed in a container and flushed with N$_2$, and mixed for 5 minutes using Thinky mixer. PU crosslinker (Melamine based crosslinker for aqueous coating from STAHL) was added and mixed for another 2 minutes, followed by 2 minutes deforming. The coating suspension was coated onto PET film using 40 μm thickness and dried in a vacuum oven at the curing temperature. 4.6 wt % Iron/Carbon coating formulation was achieved.

The same procedure was used to prepare the film at 3.5 wt % Iron/Carbon.

Table 5 show the improvement of scavenging capacity of film with ascorbic acid (AA) (40 μm coating thickness)

| | Scavenging Capacity/100 cm² | |
|---|---|---|
| | No AA | With AA |
| 3.5 wt % of Iron/Carbon in formulation | 2.4 | 3.64 |
| 4.6 wt % of Iron/Carbon in formulation | 2.3 | 5.62 |

Example 6: Improvement of Scavenging Capacity of Iron/Carbon Material with the Addition of Ascorbic Acid The oxygen scavenging capacity and performance of the prepared Iron/Carbon powder were compared with the addition of ascorbic acid. 0.05 g of Iron/Carbon oxygen scavenger powder was mixed with 0.0035 g of NaCl and 0.03 g of Ascorbic acid and the mixture was placed in a 50 ml conical flask, sealed with a rubber septum. The percentage of oxygen was monitored over a period of time. With the addition of ascorbic acid, there was an observed synergistic effect. The oxygen scavenging capacity and duration increased due to the regenerative effect of the ascorbic acid to reduce Fe(III) to Fe(II) cycle.

Figure 5:
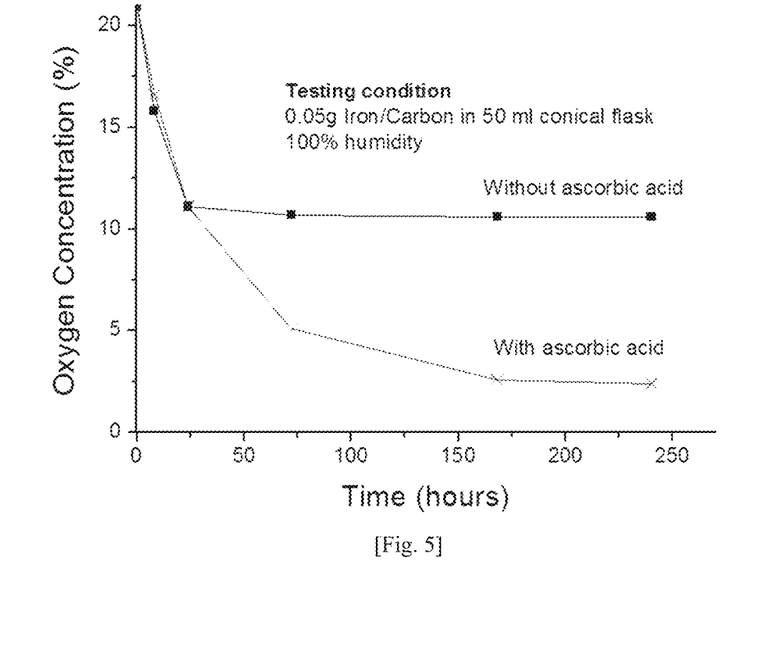
FIG. 5 shows the oxygen scavenging performance of the film with and without ascorbic acid.

The oxygen scavenging property of the Iron/Carbon oxygen scavenger material with and without ascorbic acid is shown in FIG. 5. With addition of ascorbic acid, further oxygen scavenging performance can be achieved.

Table 6 shows the improvement of scavenging capacity of Iron/Carbon oxygen scavenger material with the addition of ascorbic acid.

| Time (Hrs) | 0.05 g Fe/C with NaCl (control) | 0.05 g Fe/C with NaCl and ascorbic acid |
|---|---|---|
| 0 | 20.9% | 20.9% |
| 8 | 15.8% | 16.6% |
| 24 | 11.1% | 11.1% |
| 72 | 10.7% | 5.10% |
| 168 | 10.6% | 2.6% |
| 240 | 10.6% | 2.4% |
| Max scavenging capacity per gram of scavenger | 103 | 185 |

Example 7: Improvement of Scavenging Capacity of Iron/Carbon Coating with the Addition of Ascorbic Acid 3 ml of 1.33 wt % of MMT clay solution was bubbled with argon (Ar) for 10 minutes to remove the oxygen in the solution. 0.05 g of Iron/Carbon oxygen scavenger powder was added to the clay solution and homogenized for 10 minutes, while bubbling with Ar. 0.005 g of NaCl and 0.03 g of Ascorbic acid, previously dissolved in 1 ml of water was added to the above Iron/Carbon suspension. 10 g of polyurethane was also added, and homogenized for another 10 minutes. The mixture was then degassed using Thinky Mixer for 2 minutes. The coating suspension was coated onto PET film using 20 μm thickness coating bar and dried in a vacuum oven at the curing temperature. 1.41 wt % Iron/Carbon coating formulation was achieved.

The same procedure was used to prepare the film at 1.41 wt % Iron/Carbon coating on PET film without ascorbic acid. 5×5 cm film size was cut and placed in a 20 ml vial, tested under 100% humidity for 60° C. The addition of ascorbic acid in the coating increased the scavenging speed and capacity.

Table 7 shows improvement of scavenging capacity of Iron/Carbon coating with the addition of ascorbic acid.

| Time (Hrs) | 0.05 g Fe/C with NaCl (control) | 0.05 g Fe/C with NaCl and ascorbic acid |
|---|---|---|
| 0 | 20.9% | 20.9% |
| 8 | 15.8% | 16.6% |
| 24 | 11.1% | 11.1% |
| 72 | 10.7% | 5.10% |
| 168 | 10.6% | 2.6% |
| 240 | 10.6% | 2.4% |

-continued

| Time (Hrs) | 0.05 g Fe/C with NaCl (control) | 0.05 g Fe/C with NaCl and ascorbic acid |
|---|---|---|
| Max scavenging capacity per gram of scavenger | 103 | 185 |

The data comparison clearly showed that the combination of Iron/Carbon oxygen scavenger and ascorbic acid is not a mere addition of the individual effect. Even though ascorbic acid is known to be an oxygen scavenger, the oxygen scavenging reaction is slow on its own and a large amount of ascorbic acid is required. In the control experiment, there is no oxygen scavenging detected using ascorbic acid alone. This example shows that the ascorbic acid can form a regenerative effect for the Fe(III) to Fe(II) cycle with the Iron/Carbon oxygen scavenger, leading to a synergistic effect between the ascorbic acid and the iron.

INDUSTRIAL APPLICABILITY

In the present disclosure, the article may be used as a packaging film for food or beverage packaging for scavenging oxygen efficiently. The packaging film may be used as oxygen scavengers and may have low permeability to the flow of oxygen through the article. The use of the article for food or beverage packaging may prolong the shelf life of the food or beverage.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A coating suspension formulation comprising:
   a) an inorganic oxygen scavenger which is a composite of an inorganic metal material and a carbon material, wherein the composite comprises a plurality of the inorganic metal in particulate form disposed within the carbon material;
   b) a surfactant comprising natural clay, synthetic clay, or modified clay;
   c) an activator solution which is a halide salt or an acidifying agent;
   d) a hydrophilic agent selected from a polymer comprising monomers selected from an alkylene oxide, a carboxylic acid, and combinations thereof;
   e) an additive being ascorbic acid; and
   f) a polymeric matrix,
   wherein an amount of the additive in the coating suspension formulation is in a range of 0.1 wt % to 2.5 wt %.

2. The coating suspension formulation of claim 1, wherein the inorganic metal material has a particle size of less than 500 nm.

3. The coating suspension formulation of claim 1, wherein an amount of inorganic oxygen scavenger in the coating suspension formulation is in a range 1 wt % to 20 wt %.

4. The coating suspension formulation of claim 1, wherein an amount of surfactant in the coating suspension formulation is in a range of 0.5 wt % to 10 wt %.

5. The coating suspension formulation of claim 1, wherein an amount of the hydrophilic agent in the coating suspension formulation is in a range of 0.5 wt % to 10 wt %.

6. The coating suspension formulation of claim 1, wherein the polymeric matrix is selected from a polyurethane, a polyacrylate, a poly(meth)acrylate, a polyepoxide, or an ethylene vinyl alcohol copolymer.

7. The coating suspension formulation of claim 1, wherein the carbon material has a porous structure with a pore size in a range of 10 nm to 700 nm.

8. The coating suspension formulation of claim 1, wherein the inorganic material is iron.

9. A method to prepare the coating suspension formulation of claim 1, comprising the steps of a) mixing the inorganic oxygen scavenger, the surfactant, the activator solution, the hydrophilic agent, and the additive to form a mixture, and b) mixing the mixture from step a) with the polymeric matrix or monomers of said polymeric matrix.

10. The method of claim 9, further comprising a degassing step.

11. The method of claim 9, further comprising a cross-linking step wherein the polymeric matrix is formed by a plurality of monomers capable of forming the polymeric matrix with the addition of a polymerization crosslinker.

* * * * *